(12) United States Patent
Kamyshenko et al.

(10) Patent No.: US 8,086,756 B2
(45) Date of Patent: Dec. 27, 2011

(54) METHODS AND APPARATUS FOR WEB CONTENT TRANSFORMATION AND DELIVERY

(75) Inventors: Valentyn Kamyshenko, Fremont, CA (US); Igor Plotnikov, Sunnyvale, CA (US); Alexei G. Tumarkin, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1220 days.

(21) Appl. No.: 11/339,727

(22) Filed: Jan. 25, 2006

(65) Prior Publication Data
US 2007/0174488 A1    Jul. 26, 2007

(51) Int. Cl.
*G06F 15/16* (2006.01)
*G06F 15/167* (2006.01)

(52) U.S. Cl. ........ 709/246; 709/217; 709/218; 709/245; 708/204; 340/2.23; 340/3.54; 340/4.32; 340/4.33

(58) Field of Classification Search ............. 709/205, 709/203, 220, 218, 227, 246, 328, 224, 330, 709/202, 228, 230, 523, 245; 717/118, 126, 717/167, 142; 707/10, 2, 100, 530, 736, 707/769; 715/205; 725/46, 91; 345/629; 455/414.3; 726/2
See application file for complete search history.

(56) References Cited

U.S. PATENT DOCUMENTS

| | | | | |
|---|---|---|---|---|
| 6,067,558 A | * | 5/2000 | Wendt et al. ................... | 709/202 |
| 6,067,579 A | * | 5/2000 | Hardman et al. ............. | 719/328 |
| 6,112,228 A | * | 8/2000 | Earl et al. ....................... | 709/205 |
| 6,304,894 B1 | * | 10/2001 | Nakayama et al. ........... | 709/203 |
| 6,457,060 B1 | * | 9/2002 | Martin et al. ................. | 709/245 |
| 6,507,854 B1 | * | 1/2003 | Dunsmoir et al. ............ | 715/201 |
| 6,671,854 B1 | * | 12/2003 | Dunsmoir et al. ............ | 715/207 |
| 7,036,113 B1 | * | 4/2006 | Kumhyr ........................ | 717/142 |
| 7,275,086 B1 | * | 9/2007 | Bodnar ......................... | 709/218 |

(Continued)

FOREIGN PATENT DOCUMENTS

JP    2003141002 A    *    5/2003

OTHER PUBLICATIONS

Hanson et. al. "A web accessibility service: update and findings." ACM SIGACCESS Conference on Assistive Technologies (2004): 169-76.*

(Continued)

*Primary Examiner* — Glenton B Burgess
*Assistant Examiner* — Michael Martinez
(74) *Attorney, Agent, or Firm* — Hickman Palermo Truong & Becker LLP

(57) ABSTRACT

In a client, a system receives a set of transformation functions for use in transforming a first content, requests the first content from a gateway, and receives the first content from the gateway, including an invocation of at least one transformation function maintained on the client. The system invokes the at least one transformation function to transform the first content to access a second content on the server.

In a gateway communicating with a server, a system transmits a set of transformation functions to at least one client for use in transforming a first content, receives a request from at least one client for the first content residing on the server, rewrites the first content to include the invocation of at least one transformation function maintained on the client, and transmits the first content including the invocation of at the least one transformation function maintained on the client.

24 Claims, 5 Drawing Sheets

U.S. PATENT DOCUMENTS

| | | | |
|---|---|---|---|
| 7,287,274 B1* | 10/2007 | Houlding | 726/11 |
| 7,330,852 B2* | 2/2008 | Bailey et al. | 707/10 |
| 7,464,381 B1* | 12/2008 | Nickerson et al. | 719/311 |
| 7,640,347 B1* | 12/2009 | Sloat et al. | 709/228 |
| 7,707,223 B2* | 4/2010 | Zubenko et al. | 707/782 |
| 7,853,593 B2* | 12/2010 | Serdy et al. | 707/736 |
| 2002/0010725 A1* | 1/2002 | Mo | 707/530 |
| 2002/0073155 A1* | 6/2002 | Anupam et al. | 709/205 |
| 2002/0175923 A1* | 11/2002 | Lin et al. | 345/629 |
| 2002/0194608 A1* | 12/2002 | Goldhor | 725/91 |
| 2002/0199190 A1* | 12/2002 | Su | 725/37 |
| 2003/0023756 A1* | 1/2003 | Awamoto et al. | 709/246 |
| 2003/0106025 A1* | 6/2003 | Cho et al. | 715/523 |
| 2003/0177187 A1* | 9/2003 | Levine et al. | 709/205 |
| 2003/0182357 A1* | 9/2003 | Chess et al. | 709/203 |
| 2003/0187656 A1* | 10/2003 | Goose et al. | 704/270.1 |
| 2003/0229718 A1* | 12/2003 | Tock et al. | 709/246 |
| 2004/0006653 A1* | 1/2004 | Kamen et al. | 709/330 |
| 2004/0015852 A1* | 1/2004 | Swetland | 717/118 |
| 2004/0019596 A1* | 1/2004 | Taylor et al. | 707/100 |
| 2004/0123238 A1* | 6/2004 | Hefetz et al. | 715/513 |
| 2004/0255046 A1* | 12/2004 | Ringseth et al. | 709/246 |
| 2004/0267702 A1* | 12/2004 | Gallant et al. | 707/2 |
| 2005/0246439 A1* | 11/2005 | Fong et al. | 709/224 |
| 2006/0031404 A1* | 2/2006 | Kassab | 709/218 |
| 2006/0117073 A1* | 6/2006 | Bosworth et al. | 707/201 |
| 2006/0218305 A1* | 9/2006 | Kinnan et al. | 709/246 |
| 2006/0259544 A1* | 11/2006 | Zubenko et al. | 709/203 |
| 2006/0288208 A1* | 12/2006 | Dashora et al. | 713/167 |
| 2007/0088851 A1* | 4/2007 | Levkovitz et al. | 709/246 |
| 2007/0169170 A1* | 7/2007 | Shiran | 726/2 |
| 2007/0179641 A1* | 8/2007 | Lucas et al. | 700/83 |
| 2007/0186246 A1* | 8/2007 | Goldhor | 725/46 |
| 2008/0163038 A1* | 7/2008 | Doyle | 715/205 |
| 2009/0193126 A1* | 7/2009 | Agarwal et al. | 709/228 |
| 2009/0234962 A1* | 9/2009 | Strong et al. | 709/230 |
| 2010/0169366 A1* | 7/2010 | Stevenson et al. | 707/769 |
| 2010/0248702 A1* | 9/2010 | Montemer et al. | 455/414.3 |

OTHER PUBLICATIONS

Bolin et al., "Automation and Customization of Rendered Web Pages." UIST (2005):165-172.*

SOLARIS—Chapter 4 Using the HTML Converter to Convert Applet Tags for Java Plug-in. Tech. ORACLE, 2002.*

Cisco CTE 1400 Series Content Transformation Engine. Working paper. CISCO, 2001.*

XML Editors. W3Schools Online Web Tutorials. Jan. 18, 2006. Web. May 4, 2010. <http://www.w3schools.com/xsl/xsl_editors.asp>.*

* cited by examiner

220 REWRITE THE FIRST CONTENT TO INCLUDE THE INVOCATION OF AT LEAST ONE TRANSFORMATION FUNCTION MAINTAINED ON THE CLIENT

221 CODE THE AT LEAST ONE TRANSFORMATION FUNCTION TO CONTAIN THE FIRST CONTENT AS A FIRST PARAMETER TO THE AT LEAST ONE TRANSFORMATION FUNCTION, THE FIRST CONTENT CONVERTED TO A STRING VARIABLE

222 CODE THE AT LEAST ONE TRANSFORMATION FUNCTION TO INCLUDE A SECOND PARAMETER INDICATING A STARTING POSITION OF A FIRST SUB CONTENT CONTAINED WITHIN THE FIRST CONTENT, AND A THIRD PARAMETER INDICATING AN ENDING POSITION OF THE FIRST SUB CONTENT CONTAINED WITHIN THE FIRST CONTENT

OR

223 PARSE THE FIRST CONTENT FOR SUB CONTENT REQUIRING MODIFICATIONS

↓

224 MODIFY THE SUB CONTENT PRIOR TO CODING THE AT LEAST ONE TRANSFORMATION FUNCTION TO CONTAIN THE FIRST CONTENT AS A PARAMETER TO THE AT LEAST ONE TRANSFORMATION FUNCTION

225 MODIFY THE SUB CONTENT TO INCLUDE AT LEAST ONE OF THE GROUP CONSISTING OF:
I) REWRITE AT LEAST ONE HYPERLINK THE REWRITING INDICATING A LOCATION ON THE FIRST NETWORK, THE HYPERLINK CONTAINED WITHIN THE FIRST CONTENT
II) WRAP THE AT LEAST ONE HYPERLINK WITHIN AT LEAST ONE HYPERLINK FUNCTION, THE HYPERLINK CONTAINED WITHIN THE FIRST CONTENT
III) REWRITE THE SUB CONTENT USING AT LEAST ONE ESCAPE CHARACTER DELIMITATING THE AT LEAST ONE HYPERLINK CONTAINED WITHIN THE FIRST CONTENT

*FIG. 5*

METHODS AND APPARATUS FOR WEB CONTENT TRANSFORMATION AND DELIVERY

BACKGROUND

Conventional technologies for intranets provide a private Internet for use in organizations (i.e., companies, schools, governments, etc). Typically, an intranet utilizes the same browsers, software, servers, etc as the Internet, to serve the members of the organization, but the intranet, as a whole, is generally not accessible by the general public. Members of the organization who have access to the intranet, can also access the intranet remotely, such as an employee of a company telecommuting from home.

Often, as in the example of an intranet of a company, some pages of the intranet are made accessible to the general public. For example, a company intranet may have web pages, such as those relating to future company strategies, that are accessible to only employees of the company, and other web pages, such as those advertising job postings for the company, that are intended for the general public.

Sending information (such as web pages advertising job postings for the company) outside of an intranet is achieved through the use of a gateway. A gateway is a type of router that connects an intranet to the rest of the Internet. All information from the intranet that goes out onto the Internet goes through the intranet's gateway. The gateway transforms the content (i.e., web pages on the intranet) contained within the intranet such that users outside of the intranet can access the content. In addition, any hyperlinks contained within the content are also accessible by users outside of the intranet.

SUMMARY

Conventional technologies for accessing content outside of an intranet suffer from a variety of deficiencies. In particular, conventional techniques that access content outside of an intranet are limited in that the gateway is burdened with the task of transforming the content of the intranet for viewing outside of the intranet. Web content delivery in a secure socket layer (SSL) virtual private network (VPN) requires content analysis, parsing, and manipulation of content. This consumes large amount of computer processing and memory resources. As the content becomes more complicated, these tasks become more challenging. As a result, network devices (i.e., gateways, etc) in charge of the transformations become less scalable.

Embodiments disclosed herein significantly overcome such deficiencies and provide a system that includes a content accessing process that offloads the task of transforming the content from the gateway to the browsers on which the content is downloaded (from the gateway). The content accessing process is located both in a client and in a gateway. In the client, the content access process receives a set of transformation functions to use when receiving content from the gateway. The client installs and maintains the transformation functions and all associated libraries. In the client, the content accessing process receives the content within a transformation function. In one embodiment, the content is converted to a string variable, and passed to the transformation function as a parameter. In the client, the content accessing process invokes the transformation functions to transform the content (from the gateway) to content that is accessible on the client.

In a gateway communicating with a server on behalf of one or more clients, the content accessing process transmits the set of transformation functions to the clients that will utilize the transformation functions. When the content accessing process on the gateway receives a request, from a client, to access the content residing on the server, the content accessing process rewrites the content to include the invocation of at least one transformation function. In one embodiment, the content is converted to a string variable, and passed to the transformation function as a parameter. The content accessing process on the gateway then transmits the transformation function (containing the content converted to a string variable passed to the transformation function as a parameter) to the requesting client.

Embodiments disclosed herein provide a content accessing process that, in a client, receives a set of transformation functions for use in transforming a first content. The content accessing process requests the first content from the gateway communicating with the server on behalf of at least one client, and receives the first content from the gateway. The first content received from the gateway includes an invocation of at least one transformation function maintained on the client. The content access process invokes the transformation function to transform the first content into a form that is usable to the client to access a second content on the server. In an example configuration, the client 120 can reside on a first network, the server 130 on a second network, and the gateway 180 on a third network.

Embodiments disclosed herein provide a content accessing process that, in a gateway, transmits a set of transformation functions to at least one client for use in transforming a first content. The content accessing process receives a request from at least one client for the first content residing on the server, and after receiving this content from the server, rewrites the first content to include the invocation of at least one transformation function maintained on the client. The content accessing process then transmits the first content, including the invocation of at least one transformation function maintained on the client, to the client that requested the content on the server.

During an example operation of one embodiment, suppose a gateway communicating with a server within an intranet is tasked with handling the transformations of content requested (by a client) from a server within an intranet. The client does not have access to the content on the intranet. The content accessing process determines which of the various tasks of transformations, for example JavaScript processing, that the client can manage, and transmits to the client, those transformation functions related to JavaScript processing. For example, the content accessing process transmits to the client, a script called Browser_Processing.js, that defines a function called "JS_WRAPPER( ). The content accessing process receives a request from the client for content (containing JavaScript coding) residing on the server. The content accessing process rewrites the content by converting the content (containing the JavaScript coding) to a string variable that is passed as a parameter to the JS_WRAPPER( ) function. The content accessing process then transmits the JS_WRAPPER( ) (containing the content converted to a string variable, passed as a parameter) to the requesting client. The client receives JS_WRAPPER( ) (containing the content converted to a string variable, passed as a parameter), and invokes JS_WRAPPER( ) (previously defined within the Browser_Processing.js script that was transmitted to the client by the gateway ) to transform the content into a form such that the client can access the content contained on the server, even though the client does not have access to the intranet on which the content resides.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 5 illustrates a flowchart of a procedure performed by the system of FIG. 1 when the content accessing process (on the gateway) rewrites the first content to include the invocation of at least one transformation function maintained on the client, according to one embodiment disclosed herein.

DETAILED DESCRIPTION

Embodiments disclosed herein include a system that includes a content accessing process that offloads the task of transforming the content from the gateway to the browsers on which the content is downloaded (from the server). The content accessing process is located both in a client and in a gateway. In the client, the content access process receives a set of transformation functions to use when receiving content from the gateway. The client automatically installs and maintains the transformation functions and all associated libraries. In the client, the content accessing process receives the content within a transformation function. In one embodiment, the content is converted to a string variable, and passed to the transformation function as a parameter. In the client, the content accessing process invokes the transformation functions to transform the content (from the gateway) to content that is accessible on the client.

In a gateway, the content accessing process transmits the set of transformation functions to the clients that will utilize the transformation functions. When the content accessing process on the gateway receives a request, from a client, to access the content residing on the server, the content accessing process rewrites the content received from the server to include the invocation of at least one transformation function. The content is converted to a string variable, and passed to the transformation function as a parameter. The content accessing process on the gateway then transmits the transformation function (containing the content converted to a string variable passed to the transformation function as a parameter) to the requesting client.

Figure 1:
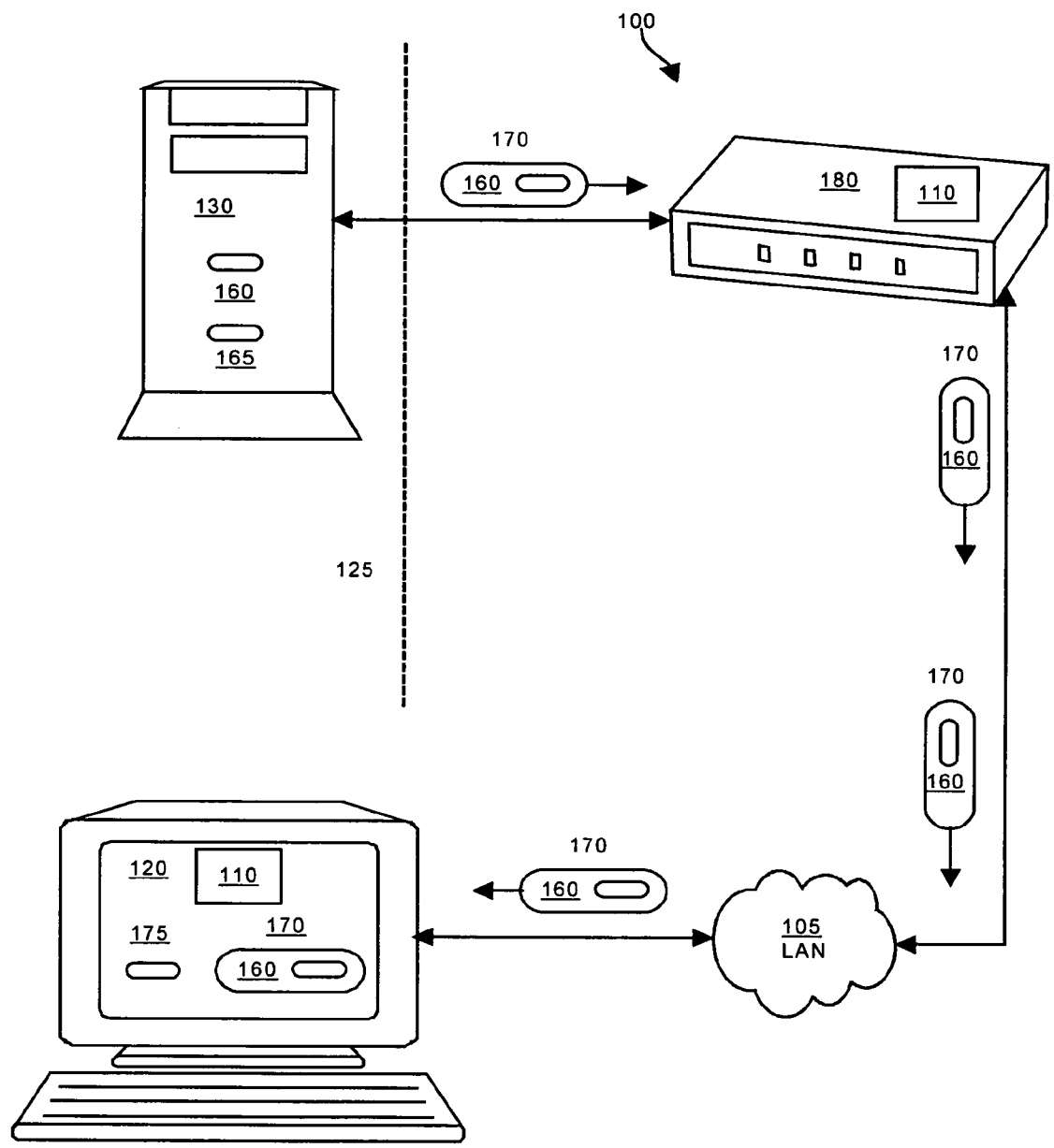
FIG. 1 shows a high level view of a network according to one embodiment disclosed herein.

FIG. 1 illustrates an example computer-networking environment 100 suitable for use in explaining example embodiments disclosed herein. The computer-networking environment 100 includes a server 130 within an intranet 125 containing a first content 160 and a second content 165. The server 130 is connected to a gateway 180 that transforms the first content 160 such that a client 120 can access the first content 160 contained on the server 130 via a local area network (LAN) 105. The content accessing process 110 runs on the gateway 180, and transmits transformation functions 170 (along with the necessary libraries 175 needed to execute the transformation functions 170) to the client 120 (who is also running the content accessing process 110). The client 120 receives the first content 160 including an invocation of a transformation function 170, and invokes the transformation function 170 to transform the content 160 into a form that is usable to the client 120 to access the second content 165 on the server.

Further details of configurations explained herein will now be provided with respect to a flow chart of processing steps that show the high level operations disclosed herein.

Figure 2:
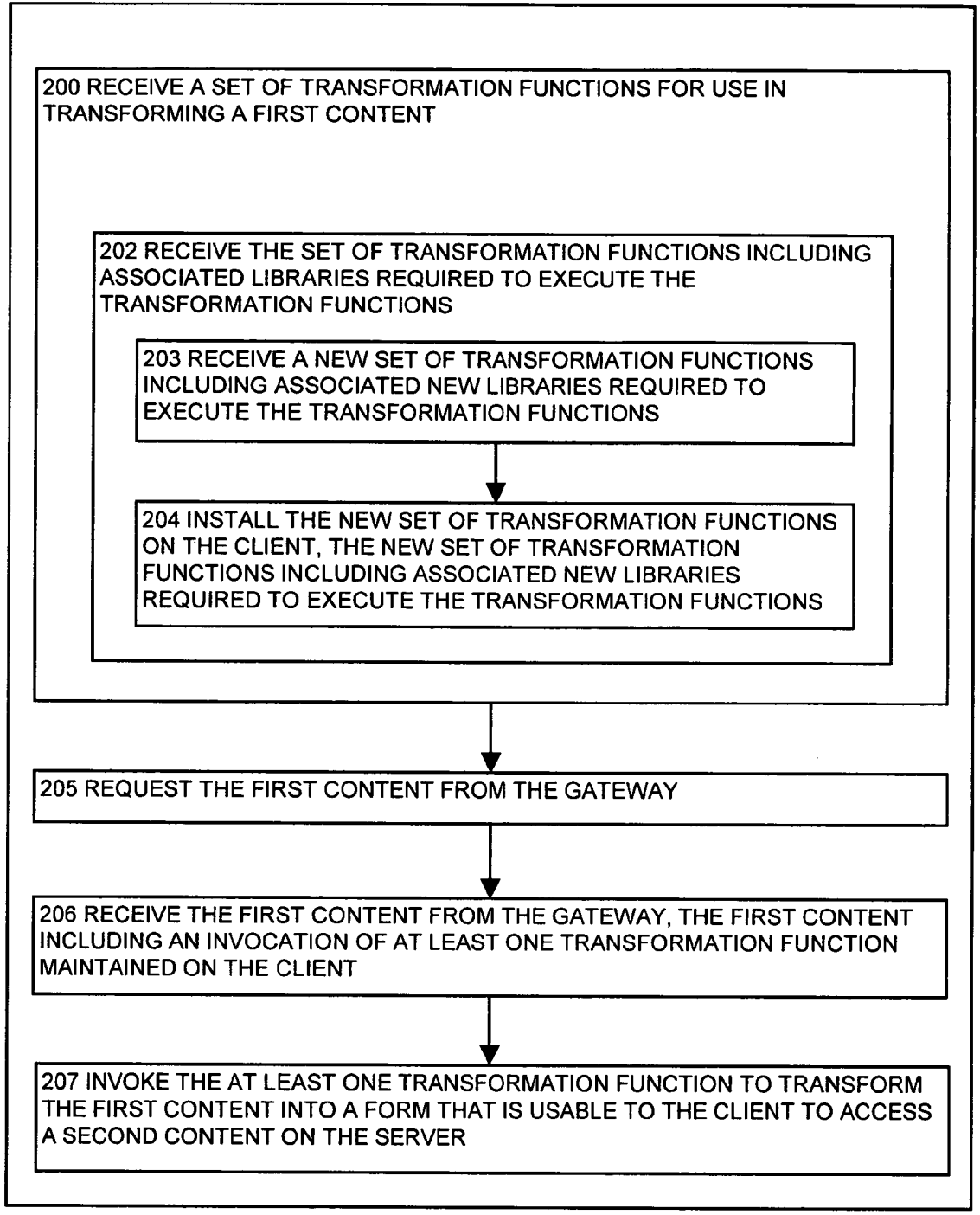
FIG. 2 illustrates a flowchart of a procedure performed by the system of FIG. 1 when the content accessing process (on the client) receives a set of transformation functions for use in transforming a first content, according to one embodiment disclosed herein.

FIG. 2 is a flowchart of the steps performed by the content accessing process 110, residing on the client 120, when it receives a set of transformation functions 170 for use in transforming a first content 160, requests the first content 160 from the server 130, and transforms the first content 160 into a form that is usable to the client 120 to access a second content 165 on the server 130.

In step 200, the content accessing process 110 receives a set of transformation functions 170 for use in transforming a first content 160. In an example configuration, the content accessing process 110 resides on the client 120, and receives a set of transformation functions 170 (at the client 120) from the gateway 180. Without receipt of the transformation functions 170 (at the client 120), and further invocation of those transformation functions 170, the gateway 180 would be burdened with the task of transforming the first content 160 residing on the server 130 such that the client 120 can access the first content 160 residing on the server 130. In an example configuration, the content accessing process 110 receives notification that the server 130 has established a connection with the client 120. In an example configuration, the client 120 resides outside of the intranet 125 on which the server 130 and gateway 180 operate.

In step 202, the content accessing process 110 receives the set of transformation functions 170 including associated libraries 175 required to execute the transformation functions 170. In an example configuration, the content accessing process 110, residing on the client 120, receives a set of transformation functions 170 from the content accessing process 110, residing on the gateway 180. The set of transformation functions 170 received at the client 120 includes the necessary libraries 175, and include files needed to execute the transformation functions 170.

In step 203, the content accessing process 110 receives a new set of transformation functions 170 including associated new libraries 175 required to execute the transformation functions 170. In an example configuration, the transformation functions 170, residing on the client 120, need to be updated. The content accessing process 110 on the client 120 receives the new, updated transformation functions 170, (from the content accessing process 110 residing on the gateway 180) and any associated libraries 175 required to execute the new, updated transformation functions 170.

In step 204, the content accessing process 110 installs the new set of transformation functions 170 on the client 120, the new set of transformation functions 170 including associated new libraries 175 required to execute the transformation functions 170. In an example configuration, it is the responsibility of the content accessing process 110, on the client 120, to install and maintain the transformation functions 170 such that they are capable of performing the transformation needed for the client 120 to access the first content 160 and second content 165 located on the server 130.

In step 205, the content accessing process 110 requests the first content 160 from the server 130. In an example configuration, the client 120 contains a browser, from which a user (not shown) attempts to access a web page (i.e., first content 160) located on the server 130 located within the intranet 125. The web page (i.e., first content 160) contains links to other content (i.e., second content 165) also located on the server 130 located within the intranet 125. When the user (not shown) attempts to access the web page (i.e., first content 160) located on the server 130, the content accessing process 110 requests the first content 160 from the server 130.

In step 206, the content accessing process 110 receives the first content 160 from the gateway 180, the first content 160 including an invocation of at least one transformation function 170 maintained on the client 120. In response to the content accessing process 110 requesting the first content 160 from the gateway 180, the content accessing process 110 receives the first content 160 from the gateway 180. The first content 160 includes an invocation of at least one transformation function 170. In an example configuration, one of the transformation functions 170 is called JS_WRAPPER( ). The content accessing process 110 receives, on the client 120, the first content 160 converted to a string variable, and passed as a first parameter to the JS_WRAPPER( ) function.

In step 207, the content accessing process 110 invokes the at least one transformation function 170 to transform the first content 160 to a form that is usable to the client 120 to access a second content 165 on the server 130. In an example configuration, the content accessing process 110 receives, on the client 120, the first content 160 converted to a string variable, and passed as a first parameter to the JS_WRAPPER( ) function. The content accessing process 110, residing on the client 120, invokes the JS_WRAPPER( ) function, converting the first content 160 (converted to a string variable, and passed as a first parameter to the JS_WRAPPER( ) function) to a form that is usable to the client 120. The client 120 can access a second content 165 on the server 130. In other words, the client 120 can access a web page (i.e., first content 160) located on the server 130, including hyperlinks (i.e., second content 165) included on the web page (i.e., first content 160), and those hyperlinks (i.e., second content 165) will resolve to web pages that are accessible at the client's 120 browser.

Figure 3:
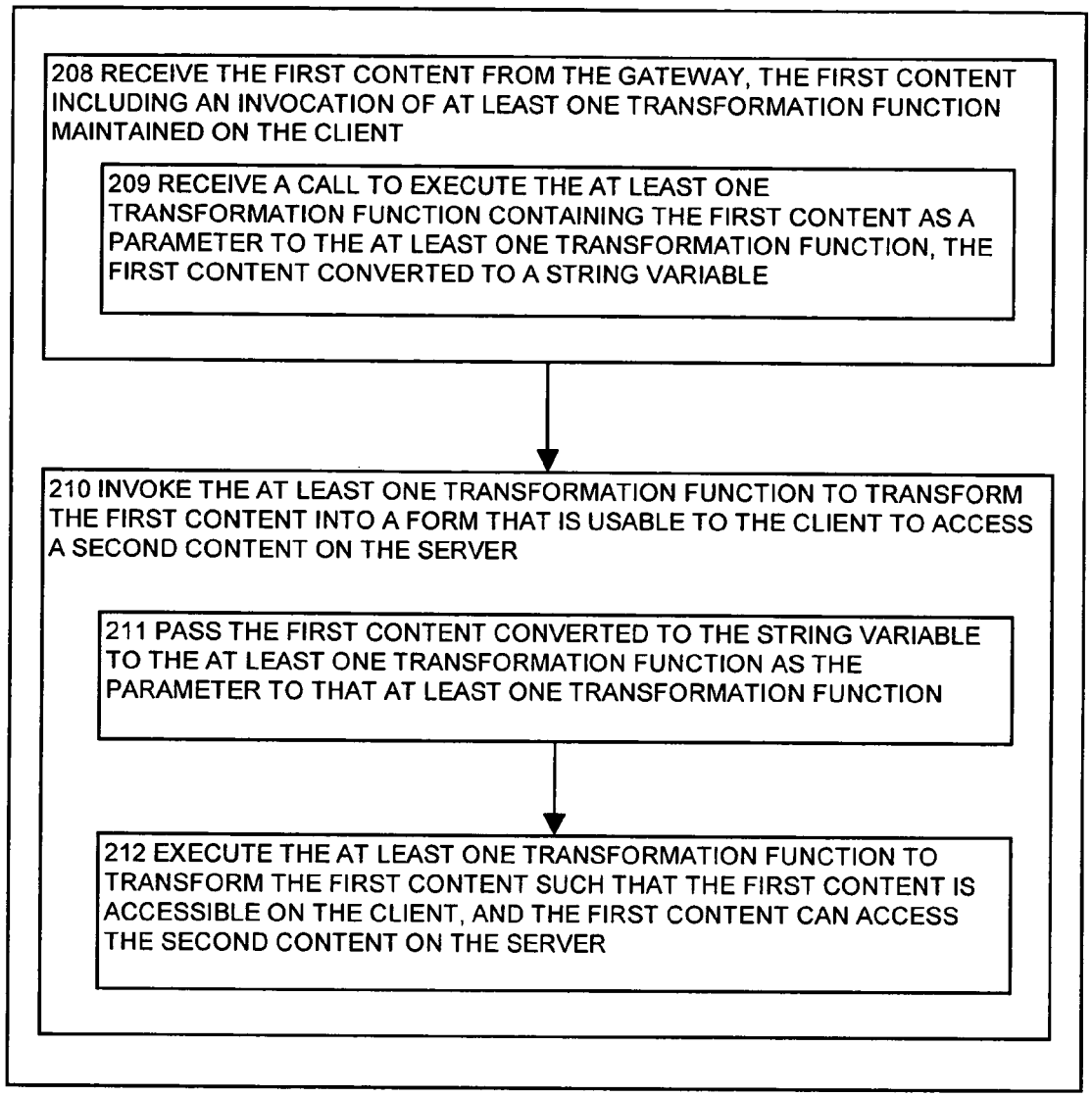
FIG. 3 illustrates a flowchart of a procedure performed by the system of FIG. 1 when the content accessing process (on the client) receives the first content from the gateway, the first content including an invocation of at least one transformation function maintained on the client, according to one embodiment disclosed herein.

FIG. 3 is a flowchart of the steps performed by the content accessing process 110, residing on the client 120, when it receives the first content 160 including invocation of at least one transformation function 170 and invokes that transformation function 170 such that the first content 160 is accessible by the client 120.

In step 208, the content accessing process 110 receives the first content 160 from the gateway 180, the first content 160 including an invocation of at least one transformation function 170 maintained on the client 120. In an example configuration, one of the transformation functions 170 is called JS_WRAPPER( ). The content accessing process 110 receives, on the client 120, the first content 160 converted to a string variable, and passed as a first parameter to the JS_WRAPPER( ) function.

In step 209, the content accessing process 110 receives a call to execute the at least one transformation function 170 containing the first content 160 as a parameter to the at least one transformation function 170. The first content 160 is converted to a string variable. In an example configuration, the content accessing process 110, residing on the client 120, receives a call to execute the transformation function 170 that was received, at the client 120 from the content accessing process 110, residing on the gateway 180.

In step 210, the content accessing process 110 invokes the at least one transformation function 170 to transform the first content 160 into a form that is usable to the client 120 to access a second content 165 on the server 130. In an example configuration, the content accessing process 110 receives, on the client 120, the first content 160 converted to a string variable, and passed as a first parameter to the JS_WRAPPER( ) function. The content accessing process 110, residing on the client 120, invokes the JS_WRAPPER( ) function, converting the first content 160 (converted to a string variable, and passed as a first parameter to the JS_WRAPPER( ) function) to a form that is usable to the client 120. The client 120 can access a second content 165 on the server 130. In other words, the client 120 can access a web page (i.e., first content 160) located on the server 130, including hyperlinks (i.e., second content 165) included on the web page (i.e., first content 160), and those hyperlinks (i.e., second content 165) will resolve to web pages that are accessible at the client's 120 browser.

In step 211, the content accessing process 110 passes the first content 160 converted to the string variable to the at least one transformation function 170 as the parameter to that at least one transformation function 170. In an example configuration, the transformation function 170 JS_WRAPPER( ) accepts at least one parameter. During invocation of the transformation function 170, the content accessing process 110 passes the first content 160 converted to the string variable as a parameter to the JS_WRAPPER( ) function (i.e., the transformation function 170).

In step 212, the content accessing process 110 executes the at least one transformation function 170 to transform the first content 160 such that the first content 160 is accessible on the client 120, and the first content 160 can access the second content 165 on the server 130. In other words, the client 120 can access a web page (i.e., first content 160) located on the server 130, including hyperlinks (i.e., second content 165) included on the web page (i.e., first content 160), and those hyperlinks (i.e., second content 165) will resolve to web pages that are accessible at the client's 120 browser.

Figure 4:
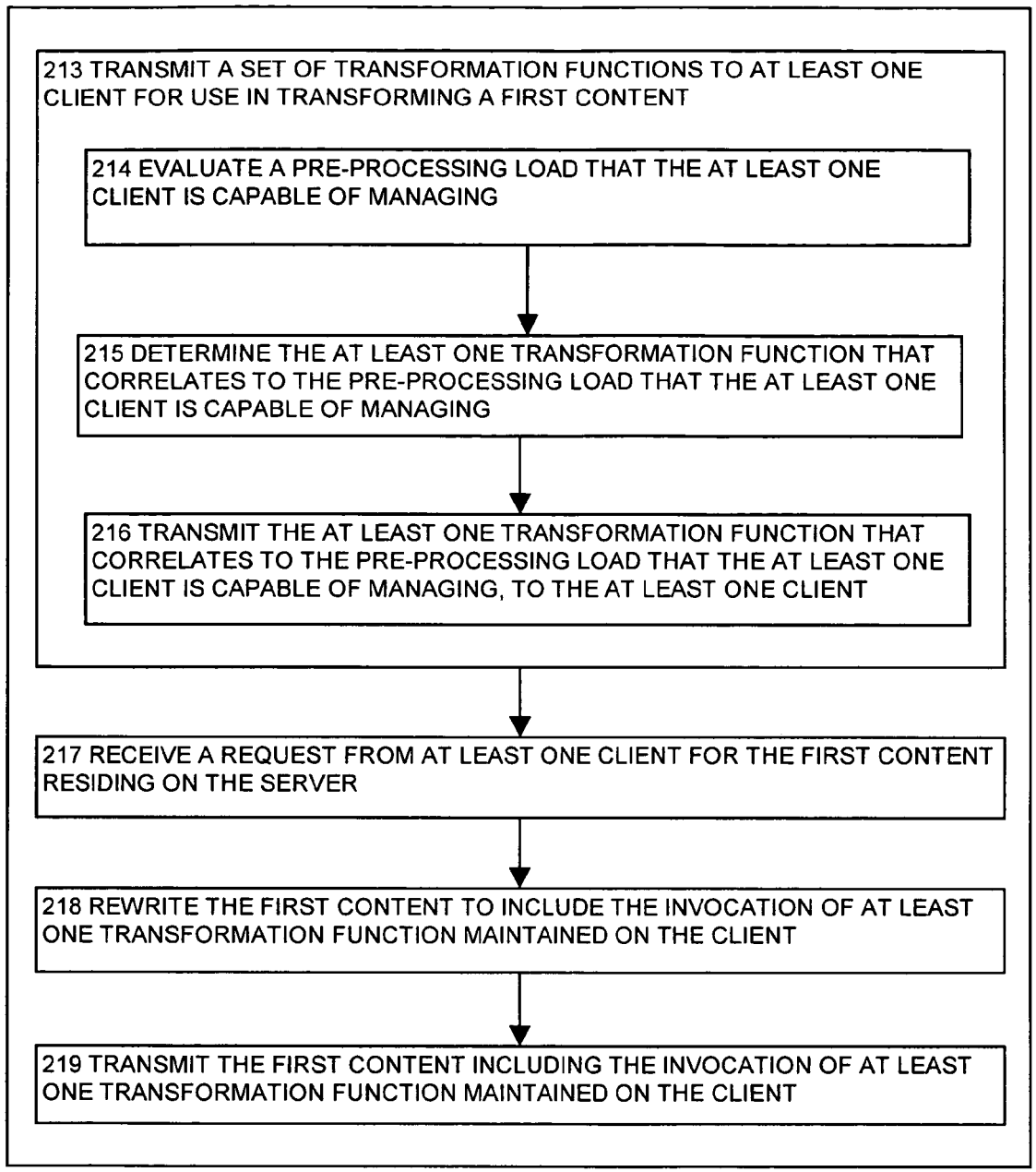
FIG. 4 illustrates a flowchart of a procedure performed by the system of FIG. 1 when the content accessing process (on the gateway) transmits a set of transformation functions to at least one client for use in transforming a first content, according to one embodiment disclosed herein.

FIG. 4 is a flowchart of the steps performed by the content accessing process 110, residing on the gateway 180, when it transmits a set of transformation functions 170 to at least one client 120, receives a request from at least one client 120 for the first content 160 residing on the server 130, and transmits that first content 160 to the requesting client 120.

In step 213, the content accessing process 110 transmits a set of transformation functions 170 to at least one client 120 for use in transforming a first content 160. In an example configuration, the content accessing process 110, residing on the gateway 180, transmits a set of transformation functions 170 to at least one client 120. The transformation functions 170 are transmitted to at least one client 120 to offload the transformation responsibilities from the gateway 180, allowing the gateway 180 to handle additional processing for the intranet 125.

In step 214, the content accessing process 110 evaluates a pre-processing load that the at least one client 120 is capable of managing. The content accessing process 110, residing on the gateway 180, determines the pre-processing load (i.e., the processing of the transformation functions 170) for each client 120 that may receive a set of transformation functions 170.

In step 215, the content accessing process 110 determines the at least one transformation function 170 that correlates to the pre-processing load that the at least one client 170 is capable of managing. In an example configuration, all transformation functions 170 are transmitted to every client 120 that is capable of taking on the responsibility of performing the transformations. In another example configuration, the content accessing process 110, residing on the gateway 180, determine what transformation processing load each client 120 can handle, and transmits to the clients 120 the respective transformation functions 170 that correlate to the transformation processing that client 120 can manage.

In step 216, the content accessing process 110 transmits the at least one transformation function 170 that correlates to the pre-processing load that the at least one client 120 is capable of managing, to the at least one client 120. In other words, the content accessing process 110, residing on the gateway 180, determines the transformation processing load the client 120 can manage, correlates the transformation functions 170 to that transformation processing load, and transmits those transformation functions 170 to the client 120.

In step 217, the content accessing process 10 receives a request from at least one client 120 for the first content 160 residing on the server 130. In an example configuration, a user (not shown) using a browser on a client 120, requests a web page (i.e., first content 160) residing on the server 130. The content accessing process 110, residing on the gateway 180, receives the request for that first content 160.

In step 218, the content accessing process 10 rewrites the first content 160 to include the invocation of at least one transformation function 170 maintained on the client 120. In an example configuration, the content accessing process 110, residing on the gateway 180, rewrites the contents of the web page (i.e., first content 160) to include the invocation of a transformation function 170, for example JS_WRAPPER( ), such that the content of the web page (i.e., first content 160) is converted to a string variable and passed as a parameter to the JS_WRAPPER( ) function.

In step 219, the content accessing process 110 transmits the first content 160 including the invocation of at least one transformation function 170 maintained on the client 120. In an example configuration, the content accessing process 110, residing on the gateway 180, transmits JS_WRAPPER( ) (i.e., a transformation function 170) with the first content 160 converted to a string variable, and passed as a parameter to the JS_WRAPPER( ) function, to the client 120. The content accessing process 110, residing on the client 120, is capable of invoking JS_WRAPPER( ) because the content accessing process 110, residing on the gateway 180, has transmitted JS_WRAPPER( ) (i.e., a transformation function 170), and all necessary libraries 175, to the content accessing process 110, residing on the client 120.

FIG. 5 is a flowchart of the steps performed by the content accessing process 110, residing on the gateway 180, when it rewrites the first content 160 to include the invocation of at least one transformation function 170 maintained on the client 120.

In step 220, the content accessing process 10 rewrites the first content 160 to include the invocation of at least one transformation function 170 maintained on the client 120. In an example configuration, the content accessing process 10, residing on the gateway 180, converts the first content 170 to a string variable, and passes that string variable, as a parameter to a transformation function 170.

In step 221, the content accessing process 110 codes the at least one transformation function 170 to contain the first content 160 as a first parameter to the at least one transformation function 170. The first content 160 is converted to a string variable. In an example configuration, the transformation function 170 accepts more than one parameter, and the first content 160, converted to a string variable, is passed as the first parameter to the transformation function 170.

In step 222, the content accessing process 110 codes the at least one transformation function 170 to include a second parameter indicating a starting position of a first sub content contained within the first content 160, and a third parameter indicating an ending position of the first sub content contained within the first content 160. In an example configuration, the transformation function 170 accepts more than one parameter, including the starting position and ending position of important information located within the first content 160. For example, the transformation function 170 might be defined as follows:

JS_WRAPPER("first content 160 converted to a string variable", first starting position, first ending position, second starting position, second ending position).

Alternatively, in step 223, the content accessing process 110 parses the first content 160 for sub content requiring modifications. In an example configuration, the content accessing process 110, residing on the gateway 180, converts the first content 160 to a string variable without inspecting the first content 160. In another example configuration, the content accessing process 110, residing on the gateway 180, parses the contents of the first content 160 to determine if there are special characters, contained within the first content 160, that require escaping characters (in order for the invocation of the transformation function 170 to execute properly), prior to converting the first content 160 to a string variable. Additional details regarding the escaping characters will be further discussed in steps 224 and 225.

In step 224, the content accessing process 110 modifies the sub content prior to coding the at least one transformation function 170 to contain the first content 160 as a parameter to the at least one transformation function 170. In an example configuration, the first content 160 contains content that will cause the transformation function 170 to execute incorrectly. For example, the transformation function JS_WRAPPER( ) accepts a string variable (contained within a set of quotes) as a first parameter. If the first content 160 already contains contents contained within quotes, execution of the JS_WRAPPER( ) (i.e., a transformation function 170) will malfunction. Thus, the content accessing process 110, residing on the gateway 180, is required to including 'escaping characters' to indicate the quotes contained within the first content 160 should be ignored during the execution of JS_WRAPPER( ) (i.e., the transformation function 170). For example:

JS_WRAPPER("first content 160 including \"escape characters\"") where the "\" character is the escaping character.

In step 225, the content accessing process 110 modifies the sub content to include at least one of the group consisting of:

i) Rewriting at least one hyperlink contained within the first content 160. The rewriting of at least one hyperlink indicates a location contained on the server 130, within the intranet 125. In an example configuration, the first content 160 is a web page, containing hyperlinks (i.e., second content 165) that point to locations on the server 130 within the intranet 125. In order for the locations associated with those hyperlinks to be accessible to the client 120, the content accessing process 110, residing on the gateway 180 rewrites those hyperlinks (i.e., second content 165) such that those hyperlinks (i.e., second content 165) are accessible to the client 120 accessing the web page (i.e., the first content 160) located on the server 130. In an example configuration, the step of re-writing at least one hyperlink can also be performed at the client 120.

ii) Wrapping the at least one hyperlink (i.e., second content 165), contained within the first content 160, within at least one hyperlink function. In an example configuration, the transformation function 170 is a hyperlink function. The hyperlink (i.e., second content 165) contained within the first content 160, is wrapped within a hyperlink function. Then the first content 160 (containing the hyperlink wrapped within a hyperlink function) is converted to a string variable, and passed as a first parameter to another transformation function 170, such as JS_WRAPPER( ). In an example configuration, the step of wrapping at least one hyperlink can also be performed at the client 120.

iii) Rewriting the sub content using at least one escape character delimitating the at least one hyperlink contained within the first content 160. In an example configuration, the hyperlink (i.e., second content 165) contains characters, such as quotes, that need to be escaped prior to being wrapped within a transformation function 170. The content accessing process 110, residing on the gateway 180, rewrites the hyperlink (i.e., second content 165) using an escape character prior to wrapping the hyperlink within a transformation function 170. In an example configuration, the step of re-writing the sub content can also be performed at the client 120.

It should be noted that, in an example configuration, the client 120 can reside on a first network, the server 130 on a second network, and the gateway 180 on a third network.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

The invention claimed is:

1. A method comprising:
receiving, at a client, a set of transformation functions for use in transforming internal links to contents, wherein the internal links, if received by the client, are not usable, without transformation by the client, to access the contents;
requesting first content from a gateway, logically positioned between the client and a server on which the first content resides;
receiving the first content from the gateway, wherein the first content includes an internal link to a second content, wherein the internal link, before transformation, comprises a first reference to a second content, wherein the first reference is not usable by the client to access the second content, wherein the first content includes an invocation of a transformation function of the set to transform the internal link into a form that is usable by the client to access the second content, wherein the usable form comprises a second reference to the second content;
wherein, as received, the invocation of the transformation function is wrapped around the internal link in the first content; and
invoking the transformation function to transform the internal link in the first content into the form that is usable to the client to access the second content;
wherein the method is performed by one or more processors.

2. The method of claim 1, wherein receiving the set of transformation functions for use in transforming internal links to contents comprises:
receiving the set of transformation functions including associated libraries required to execute the transformation functions.

3. The method of claim 2 wherein receiving the set of transformation functions including associated libraries required to execute the transformation functions comprises:
receiving a new set of transformation functions including associated new libraries required to execute the transformation functions; and
installing the new set of transformation functions on the client, the new set of transformation functions including associated new libraries required to execute the transformation functions.

4. The method of claim 1, wherein
the invocation of the transformation function comprises a call to execute the transformation function containing internal link in the first content as a parameter to the transformation function, the internal link in the first content converted to a string variable.

5. The method of claim 4, wherein invoking the transformation function comprises:
passing the internal link in the first content converted to the string variable to the transformation function as the parameter to that transformation function; and
executing the transformation function to transform the internal link in the first content into the form that is usable to the client, and using the transformed internal link to access the second content.

6. A method comprising:
transmitting a set of transformation functions to at least one client for use in transforming internal links to contents, wherein the internal links, if received by the at least one client, are not usable, without transformation by the at least one client, to access the contents;

receiving, at a gateway logically positioned between the at least one client and a server, a request from the at least one client for a first content residing on the server;

receiving, at the gateway, the first content from the server, wherein the first content includes an internal link to a second content, wherein the internal link, before transformation, comprises a first reference to the second content, wherein the first reference is not usable by the at least one client to access the second content;

wherein the first content received from the server does not include any transformation functions or any invocations of transformation functions for transforming the internal link to a form that is useable by the at least one client to access the second content;

in response to receiving the first content item, the gateway adding to the first content an invocation of a transformation function of the set maintained on the at least one client for use in transforming the internal link to the form that is usable by the at least one client to access the second content, wherein the usable form comprises a second reference to the second content;

after adding the invocation of the transformation function, transmitting, from the gateway to the at least one client, the first content;

wherein the method is performed by one or more processors.

7. The method of claim 6 wherein transmitting a set of transformation functions to at least one client for use in transforming internal links to contents comprises:

evaluating a pre-processing load manageable by the at least one client;

determining the set of transformation functions that correlates to the pre-processing load manageable by the at least one client; and transmitting the set of transformation functions that correlates to the pre-processing load manageable by the at least one client, to the at least one client.

8. The method of claim 6, wherein the gateway adding the invocation comprises:

parsing the first content for a portion of the first content requiring modifications; and modifying the first content by adding the invocation of the transformation function maintained on the at least one client, wherein the portion of the first content is a parameter to the invocation.

9. The method of claim 8, wherein the gateway resides within a first network and the at least one client resides on a second network and where modifying the first content comprises wrapping at least one hyperlink within at least one hyperlink function, the hyperlink contained within the first content.

10. The method of claim 6, further comprising:

encoding the invocation of the transformation function to include a second parameter indicating a starting position of a first portion of the first content contained within the first content, and a third parameter indicating an ending position of the first portion of the first content contained within the first content.

11. The method of claim 1, wherein invoking the transformation function comprises rewriting at least one hyperlink the rewriting indicating a location on a network accessible to the client, the hyperlink contained within the first content.

12. A non-transitory computer-readable storage medium storing one or more sequences of instructions that, when executed by one or more processors, cause the processors to perform:

receiving, at a client, a set of transformation functions for use in transforming internal links to contents, wherein the internal links, if received by the client, are not usable, without transformation by the client, to access the contents;

requesting first content from a gateway, logically positioned between the client and a server on which the first content resides;

receiving the first content from the gateway, wherein the first content includes an internal link to a second content, wherein the internal link, before transformation, comprises a first reference to a second content, wherein the first reference is not usable by the client to access the second content, wherein the first content includes an invocation of a transformation function of the set to transform the internal link into a form that is usable by the client to access the second content, wherein the usable form comprises a second reference to the second content;

wherein, as received, the invocation of the transformation function is wrapped around the internal link in the first content; and invoking the transformation function to transform the internal link in the first content into the form that is usable to the client to access the second content.

13. The non-transitory computer-readable storage medium of claim 12, wherein the instructions that cause receiving the set of transformation functions for use in transforming internal links to contents comprise instructions that cause receiving the set of transformation functions including associated libraries required to execute the transformation functions.

14. The non-transitory computer-readable storage medium of claim 13, wherein the instructions that cause receiving the set of transformation functions comprise instructions that cause:

receiving a new set of transformation functions including associated new libraries required to execute the transformation functions;

installing the new set of transformation functions on the client, the new set of transformation functions including associated new libraries required to execute the transformation functions.

15. The non-transitory computer-readable storage medium of claim 12, wherein invocation of the transformation function comprises a call to execute the at least one transformation function containing the internal link in the first content as a parameter to the at least one transformation function, the internal link in the first content converted to a string variable.

16. The non-transitory computer-readable storage medium of claim 15, wherein the instructions that cause invoking the at least one transformation function comprise instructions that cause:

passing the internal link in the first content converted to the string variable to the transformation function as the parameter to that transformation function;

executing the transformation function to transform the internal link in the first content into the form that is usable by the client, and using the transformed internal link to access the second content.

17. A non-transitory computer-readable storage medium storing one or more sequences of instructions that, when executed by one or more processors, cause the processors to perform:

transmitting a set of transformation functions to at least one client for use in transforming internal links to contents, wherein the internal links, if received by the at least one client, are not usable, without transformation by the at least one client to access the contents;

receiving, at a gateway logically positioned between the at least one client and a server, a request from the at least one client for a first content residing on the server;

receiving, at the gateway, the first content from the server, wherein the first content includes an internal link to a second content, wherein the internal link, before transformation, comprises a first reference to the second content, wherein the first reference is not usable by the at least one client to access the second content;

wherein the first content received from the server does not include any transformation functions or any invocations of transformation functions for transforming the internal link to a form that is useable by the at least one client to access the second content;

in response to receiving the first content item, the gateway adding to the first content an invocation of a transformation function of the set maintained on the at least one client for use in transforming the internal link to the form that is usable by the at least one client to access the second content, wherein the usable form comprises a second reference to the second content;

after adding the invocation of the transformation function, transmitting, from the gateway to the at least one client, the first content.

18. The non-transitory computer-readable storage medium of claim 17, wherein the instructions that cause transmitting a set of transformation functions to at least one client for use in transforming internal links to contents comprise instructions that cause:

evaluating a pre-processing load manageable by the at least one client;

determining the set of transformation functions that correlates to the pre-processing load manageable by the at least one client;

transmitting the set of transformation functions that correlates to the pre-processing load manageable by the at least one client, to the at least one client.

19. The non-transitory computer-readable storage medium of claim 17, wherein the instructions further comprise instructions that cause:

parsing the first content for a portion of the first content requiring modifications;

modifying the first content by adding the invocation of the transformation function maintained on the at least one client, wherein the portion of the first content is a parameter to the invocation.

20. The non-transitory computer-readable storage medium of claim 19, wherein the gateway resides within a first network and the at least one client resides on a second network and wherein the instructions further comprise instructions that cause:

wrapping at least one hyperlink within at least one hyperlink function, the hyperlink contained within the first content.

21. The non-transitory computer-readable storage medium of claim 17, wherein the instructions further cause:

encoding the invocation of the transformation function to include a second parameter indicating a starting position of a first portion of the first content contained within the first content, and a third parameter indicating an ending position of the first portion of the first content contained within the first content.

22. The non-transitory computer-readable storage medium of claim 12, wherein the instructions that cause invoking the transformation function comprise instructions that cause rewriting at least one hyperlink the rewriting indicating a location on a network accessible to the client, the hyperlink contained within the first content.

23. The method of claim 8, wherein the gateway resides within a first network and the at least one client resides on a second network and wherein modifying the first content comprises rewriting the portion of the first content using at least one escape character delimiting at least one hyperlink contained within the first content.

24. The non-transitory computer-readable storage medium of claim 19, wherein the gateway resides within a first network and the at least one client resides on a second network and wherein the instructions further comprise instructions that cause rewriting the portion of the first content using at least one escape character delimiting at least one hyperlink contained within the first content.

* * * * *